United States Patent [19]
Appel

[11] Patent Number: 5,337,410
[45] Date of Patent: Aug. 9, 1994

[54] DATA STREAM CONCENTRATOR PROVIDING ATTRIBUTE DATA STORAGE AND GRAPHICS PIPELINE ACCESS

[75] Inventor: Peter C. Appel, Loveland, Colo.

[73] Assignee: Hewlett-Packard Company, Palo Alto, Calif.

[21] Appl. No.: 60,478

[22] Filed: May 11, 1993

Related U.S. Application Data

[63] Continuation of Ser. No. 494,716, Mar. 16, 1990, abandoned.

[51] Int. Cl.⁵ .............................................. G06F 15/62
[52] U.S. Cl. .................................. 395/162; 395/166; 395/650; 370/60
[58] Field of Search ................. 395/118, 123, 125–127, 395/133, 141, 155, 161–166, 375, 650; 370/60, 56; 364/DIG. 1, DIG. 2, 131, 133, 136

[56] References Cited

U.S. PATENT DOCUMENTS

| | | | |
|---|---|---|---|
| 4,847,755 | 7/1989 | Morrison et al. | 395/650 |
| 4,862,392 | 8/1989 | Steiner | 395/127 |
| 5,034,946 | 7/1991 | Smith | 370/60 |
| 5,142,677 | 8/1992 | Ehlig et al. | 395/650 |

OTHER PUBLICATIONS

A Parallel Processor Architecture for Graphics Arithmetic Operations, John G. Torborg, Computer Graphics, vol. 21, No. 4, Jul. 1987; pp. 197–204.

*Primary Examiner*—Heather R. Herndon
*Assistant Examiner*—Almis Jankus

[57] ABSTRACT

A method and apparatus for merging command/data packets from a plurality of parallel processing units into a concentrated data stream, while also providing for pipeline attribute data storage, direct user access to the pipeline, redirection of the pipeline, data insertion into the pipeline and pipeline diagnostics. The data from a plurality of parallel processing units is recombined in the same order as originally transmitted and then inputted into a buffer for entry into the pipeline. Attribute switching commands are deciphered by the concentrator of the invention and selectively stored and retrieved from the pipeline. New attribute values are passed downstream on command when they are different from existing attributes, or conversely, the concentrator may be overridden by the user so that attribute values supplied by the user may be stored and passed downstream. This technique thus minimizes repetitiveness in attribute switching. Further diagnostics capabilities are provided whereby a user of the graphics processing system is given the ability to plug the pipeline and independently check different data sources and destinations to see if they are functioning properly. This process is further enhanced by the capability of the invention to check the status of each of the concentrator elements in parallel to determine if they are ready before performing any data transfer.

43 Claims, 3 Drawing Sheets

DATA STREAM CONCENTRATOR PROVIDING ATTRIBUTE DATA STORAGE AND GRAPHICS PIPELINE ACCESS

This is a continuation of copending application Ser. No. 07/494,716 filed on Mar. 16, 1990, now abandoned.

BACKGROUND OF THE INVENTION

1. Field of the Invention

The present invention relates to a concentrator which merges command/data streams from a plurality of parallel processors into a command/data pipelined stream having the same ordering in which the commands were received by the processors, and more particularly, to a data stream concentrator which also provides attribute switching and direct user access to the command/data pipeline. Also, to facilitate diagnostics testing, the concentrator of the invention allows different data sources and data destinations to be specified by the user via a single command before and during data transfer.

2. Description of the Prior Art

As defined by Black in *Data Communications and Distributed Networks*, 2nd edition, Prentice-Hall, 1987, pp. 107–108, a concentrator is a device having n input lines, which, if all input devices are active, would exceed the capacity of the output line. The concentrator thus manages the n input lines such that in the event excessive input traffic is beginning to saturate the concentrator, some devices are ordered to reduce transmission or are not allowed to transmit at all. Such a concentrator is often confused with statistical multiplexers, which are often used as a combination concentrator/front end to enable a device to communicate with multiple channels. A statistical multiplexer is often referred to as a port concentrator, which is responsible for control of a line so as to provide buffering, error detection and line synchronization with remote components and to switch the devices to the available ports as required.

Thus, both the concentrator and the statistical multiplexer determine the order in which a plurality of input lines are to be connected to one of several outputs. In general, the order is based on the time order by which data arrives at the input. In addition, the order is also characterized by the data lines having no relationship with each other. However, it is often desirable, as when performing parallel processing, for the input command sequence to be maintained when the outputs of the parallel processors are recombined into sequential order, rather than automatically basing the sequencing on a first come, first serve priority scheme. Moreover, as during parallel processing, there can be and generally is some relationship between the data sources. It is desirable that the aforementioned features of concentrators and statistical multiplexers be available in this environment as well. However, no concentrator has been previously disclosed which provides the aforementioned data management functions of a concentrator while also considering the relationship of the data sources, and this remains a problem in the parallel processing art, particularly in the graphics processing environment.

Parallel processing units (or transform engines) have been used for several years to improve processing speed in the interactive 3-D graphics environment since significant arithmetic processing is required to handle the complex models of 3-D graphics. For the necessary processing efficiency to be realized, a mechanism has been necessary for optimally allocating the input sequential data to one or more of the parallel processing units. Also, when the original data ordering is to be maintained, a mechanism has been necessary for reading the outputs from each of the parallel processing units and resequencing the processed data so that it has the same order as the original data stream. However, such prior art mechanisms have had only limited success.

For example, one technique in the prior art for allocating sequential input data to a plurality of parallel processing units has been to assign one parallel processing unit as a master while the other processing units operate as slaves. The master passes out commands to the slaves generally in accordance with an adaptive load balancing algorithm whereby the master selects a slave which has the least amount of work buffered up to become the next processing unit to receive input. If all slaves are completely out of input buffer space, then the master becomes the active processing unit. The master will remain the active processing unit until a slave has available input buffer space and a minimum number of commands have been executed. The minimum size of the master's block of commands, along with the size of the blocks of commands given to the slaves, may be adjusted to improve processing efficiency. In addition, in order to ensure that the processed data may be resequenced after processing in the assigned processing unit, the master may write to a RAM FIFO a value identifying the slave processing unit to which a particular command has been assigned. The order of the writes into the RAM FIFO enables the master to maintain the same rendering order as the order that the commands were originally received at the master's input buffer.

However, such a technique has the disadvantage that all of the processing units cannot be identical and programmed identically, thereby increasing the costs and complexity of the system. Moreover, if one or more of the slave processing units are kept busy with a complex data processing command, the benefits of parallel processing may be soon lost.

Another technique in the prior art for allocating sequential input data to a plurality of parallel processing units has been described, for example, by Torborg in "A Parallel Processor Architecture for Graphics and Arithmetic Operations", Proceedings of SIGGRAPH, Volume 21, Number 4, July 1987. Torborg therein describes a graphics processor architecture having an arbitrary number of identical processors operating in parallel which are programmed identically as if each processor were a single processor system. In particular, Torborg discloses that parallel processing in up to eight arithmetic processors may be used for front end geometric and arithmetic operations to improve processing time for an interactive 3-D graphics system. Torborg also observes that the graphics commands must be adequately distributed among the processors for efficient processor utilization and that the multiple parallel processors must produce the same apparent results as a single processor performing the same operations.

For implementing his system, Torborg observes that many graphics commands are order-independent and hence their processing and rendering order may be changed without affecting the display. However, for those graphics commands which are not order-independent, Torborg proposes to delay the processors which are processing other commands until all processors are synchronized before processing the sequential command. Torborg indicates that due to the buffering of the processor output that this synchronization has a minimal effect on processing efficiency.

Torborg further proposes to transfer pipelined data to the parallel arithmetic processors whenever data is available and the appropriate arithmetic processor is ready for data. The graphics commands are distributed to the arithmetic processors depending upon whether the inputted command is a global command which is to be sent to all arithmetic processors, a command which is sent to the arithmetic processor most ready to accept the command as determined by a command arbitration mechanism, or a command which is to be sent to a specific arithmetic processor as specified within the graphics command. Command arbitration is used to determine which arithmetic processor should receive the command if it can be processed in parallel. The arbitration mechanism attempts to fairly distribute commands between processors in order to improve processing efficiency by giving priority to processors which are most ready to accept the command. For this purpose, Torborg discloses that each processor may have a command input buffer which is used to buffer commands from a display list manager. The buffer is deep enough that it can contain several commands simultaneously, and the commands may be requested on different priority levels depending upon the amount of data in its input buffer. Distribution priority is then given to the processors executing the commands which take the least amount of time to process as indicated by the status of the input buffers.

Sequencing is generally maintained in the system of Torborg by maintaining a small tag FIFO in each processor for keeping track of the ordering of all sequential commands being processed by all arithmetic processors and all commands being processed by the particular processor containing the tag FIFO. A two bit entry in the tag FIFO is used by Torborg to indicate whether the command is being processed by the particular arithmetic processor containing the tag FIFO and whether the command is a sequential command. The output of the tag FIFO is used to insure sequential processing of all order dependent commands and to control the order in which the processed data is transferred to an image memory unit for subsequent display. In particular, the output of the tag FIFO is used to control arbitration on the bus by which the parallel graphics processing units are connected to the image memory unit. For example, if the two control bits of the tag FIFO indicate that the command is not sequential, then the output controller will request the bus as soon as a complete command block is available. In this case, the order in which commands are transferred to the image memory unit will depend on the processor load and command distribution of all processors. The tag FIFO output will be clocked after each command group associated with a single graphics input command is transferred over the bus to the image memory unit.

However, if the tag FIFO indicates a sequential command, the output controller will wait until all other arithmetic processor output controllers have reached the same point in the original command stream for purposes of synchronization. In other words, the output controller will wait until all arithmetic processors reach the entry in their tag FIFOs corresponding to a particular sequential command, thereby synchronizing the arithmetic processors, before the sequential command is output for processing. Since every processor in the system of Torborg places an entry into its tag FIFO for every sequential command (even if the command is not executed by that processor), all processors' tag FIFOs will indicate a sequential command but only one will indicate that the command was processed by that processor. The processor which has processed the sequential command will then request the bus and send the group of commands associated with the graphics input command to the image memory unit. Once this command transfer has completed, the tag FIFO output on all arithmetic processors will be clocked. As noted above, Torborg indicates that processing efficiency is maintained in this system since the processor core can still continue to transfer commands into the output FIFO of the processors while the output controller synchronizes all of the processors to maintain sequentiality.

Thus, in the system of Torborg, a mechanism is provided for assigning sequential commands to a plurality of parallel processors and then recombining the processed outputs into the original ordering using values stored in a tag FIFO for output bus arbitration. However, the tag values must be maintained for each processor independently, and sequentiality must be maintained by synchronizing the outputs of all processors when a sequential instruction is received. As a result, processing efficiency can become quite low, especially when several global (sequential) instructions are received in succession. Moreover, the command stream cannot be reordered to allow maximum use of parallel processing capabilities. Thus, when a complex input graphics primitive such as B-spline patches having a potentially long execution time compared with their input buffer size are received, processing inefficiency may be compounded.

Prior art data processing systems are also inefficient in that it is quite difficult to insert a command/data packet into the data stream after it has been resequenced since, as noted above, prior art concentrators are typically time based and must be resynchronized to allow command/data packet insertion. To avoid this problem, prior art concentrators instead pass repetitious data into the data stream without providing direct pipeline access. Conversely, prior art concentrators allow the various inputs to communicate with each other to determine whether downstream data attributes need to be changed. If so, an additional command/data packet containing the desired attributes is input into the system, processed by one of the parallel processors and sent downstream. Such prior art techniques are ineffective and quite complicated.

As noted above, concentrators enable the processing system to send data from one or more sources to one of several outputs. Typically, a plurality of data stages are provided for the switching. However, such prior art concentrators generally do not allow the input data streams to be routed by a single command specifying one source and one or more destinations, for the sources and destinations are generally chosen for their availability. Moreover, such prior art systems typically do not concurrently evaluate whether desired data source devices and data destination devices are ready for data transfer. As a result, further processing efficiency is lost.

Accordingly, there is a long-felt need for a concentrator which can merge a plurality of data streams from a plurality of inputs so as to form a command/data pipeline as well as permit command/data packet insertion and source/destination designation without adversely affecting the efficiency of the processing system. The concentrator of the invention has been designed to meet these needs.

SUMMARY OF THE INVENTION

The above-mentioned long-felt needs in the art have been met in accordance with the present invention, which relates to a concentrator consisting of several components which act together to enable data streams from different input devices to be combined in a predefined order to form a pipelined data stream which can be distributed to one or more specified destinations. The input data streams are generally recombined in a predefined order which is independent of the form or format of the data that is being processed. In addition, command/data packets and/or data attributes may be inserted into the pipelined data stream by specifying the pipelined data stream as the data destination and specifying a particular device as the data source. This feature of the invention is particularly useful for diagnostic purposes. The concentrator so arranged allows for increased processing efficiency while also providing improved flexibility in a pipeline processing environment.

In accordance with the invention, a concentrator is provided for forming a pipelined data stream from data provided by one or more data sources and for providing access to this pipelined data stream for the insertion and extraction of data. The concentrator in accordance with the invention comprises at least one data source for providing packets of data processing commands and associated data as well as means for combining these packets in a predetermined order to form the pipelined data stream. The invention is further characterized in that means are provided for outputting the pipelined data stream to at least one data destination under direct user control. This data destination may be the output buffer of the concentrator or may be the host processing system or both, which is monitored by the user for diagnostic purposes.

A preferred embodiment of the invention is further characterized in that command/data packets and/or attribute data may be selectively extracted and inserted directly from and into the pipelined data stream on command of a user. This feature of the invention is particularly useful in providing attribute switching where the data attributes are stored in data storage means which is selectively given access to the pipelined data stream in accordance with received instructions. The attribute data typically specifies the context in which subsequently received command/data packets are to be processed, and when the attribute data in the data storage means is updated, it is necessary that the new attribute data be sent downstream. The attribute data in the data storage means may be inserted directly into the pipelined data stream on command of the user during diagnostic testing, for example, or conversely, the attribute data may be inserted directly into the data storage means on command of the user. Similarly, the data storage means may be designated as a data source so that the attribute data stored in the data storage means may be sent downstream under direct user control or when a later command is received.

The invention also preferably comprises an attribute identification means for comparing an attribute identification number in a command with an attribute identification number representing an attribute stored in the data storage means which is currently installed downstream in the pipelined data stream, and for storing the attribute data corresponding to the attribute identification number in the command into the data storage means when the attribute data corresponding to the attribute identification number in the command is not the same as the attribute stored in the data storage means which is currently installed downstream in the pipelined data stream. The new attribute may be stored and sent downstream in the same or subsequent commands. Preferably, the attribute identification means comprises a comparator for comparing the attribute identification number stored in the data storage means at a predetermined address with the attribute identification number in a received command.

In accordance with another embodiment of the invention, the concentrator concurrently checks whether all data sources and all data destinations may respectively output and receive data and only allows transfer of data packets from a data source specified by a user to at least one data destination specified by a user when the specified data source is ready to output data and the specified data destination is ready to receive data. The data sources and data destinations are also preferably checked in this manner before a data transfer is attempted in response to a command from the pipelined data stream. This evaluation is preferably performed in parallel to further increase processing efficiency. Moreover, by implementing both the source and destinations as FIFOs, a minimum wait for data transfer is possible.

In a preferred embodiment of the invention, the concentrator is used for merging graphics commands and graphics primitives into a pipelined graphics data stream. In such an environment, the concentrator of the invention allows attribute data specifying at least one of the color, line style, surface texture and transparency of the graphics primitive as well as graphics contexts including, for example, window size, background and foreground color to be inserted into the graphics pipeline. A graphics diagnostic bus is also provided whereby a user of the graphics system may plug the graphics pipeline and view the processing of a particular graphics command with particular graphics data. Although disclosed in the context of a graphics subsystem, one skilled in the art will appreciate that the concentrator of the invention may be beneficially used in numerous other processing environments as well.

The invention also comprises a method of forming and providing access to a pipelined data stream. This method in accordance with the invention generally comprises the steps of:

providing packets of data processing commands and associated data from at least one data source;

combining the packets of data processing commands and associated data in a predetermined order to form the pipelined data stream; and providing the pipelined data stream to at least one data destination under direct user control.

The method in accordance with the invention may also include the step of selectively extracting and inserting packets of data processing commands and associated data directly from and into the pipelined data stream on command of a user. Attribute data may also be inserted into the pipelined data stream from an attribute data storage device under control of the user or the data processing commands. Such attribute data typically specifies the context in which subsequent data packets are to be processed, and the attribute data in the data storage device is preferably updated when a command causes the attributes to be changed downstream. On the other hand, attribute data supplied directly by the user may be stored in the data storage device for diagnostic purposes. In such a case, the data storage device may be designated as a data source so that the attribute data stored in the data storage device may be provided to at least one data destination under direct user control.

A preferred method in accordance with the invention may also include the steps of comparing an attribute identification number in a command with an attribute identification number representing an attribute stored in the data storage means which is currently installed downstream in the pipelined data stream and storing the attribute data corresponding to the attribute identification number in the command into the attribute ID storage means when the attribute data corresponding to the attribute identification number in the command is not the same as the attribute stored in the attribute ID storage means which is currently installed downstream in the pipelined data stream. The new attribute may be stored and sent downstream in the same or subsequent commands.

In accordance with another preferred method of the invention, the concentrator concurrently checks whether all data sources and all data destinations may respectively output and receive data before transferring data packets from a data source specified by a data processing command in the command/data stream. Thus, only when the specified data source is ready to output data and the specified data destination is ready to receive data will data be transferred. The same steps are also taken when the data sources and data destination are specified by a user for diagnostic purposes.

Accordingly, the invention preferably orders input data streams from one or more data sources in the same ordering that the data processing commands were received while also allowing attribute data to be stored and inserted into the pipeline when a command causes an attribute to be changed. Improved diagnostic techniques are also possible since the user has the capability of plugging the pipeline and examining the pipeline contents after a particular command is received.

BRIEF DESCRIPTION OF THE DRAWINGS

These and other objects and advantages of the invention will become more apparent and more readily appreciated from the following detailed description of the presently preferred exemplary embodiment of the invention taken in conjunction with the accompanying drawings of which.

DETAILED DESCRIPTION OF THE PRESENTLY PREFERRED EMBODIMENT

Figure 1:
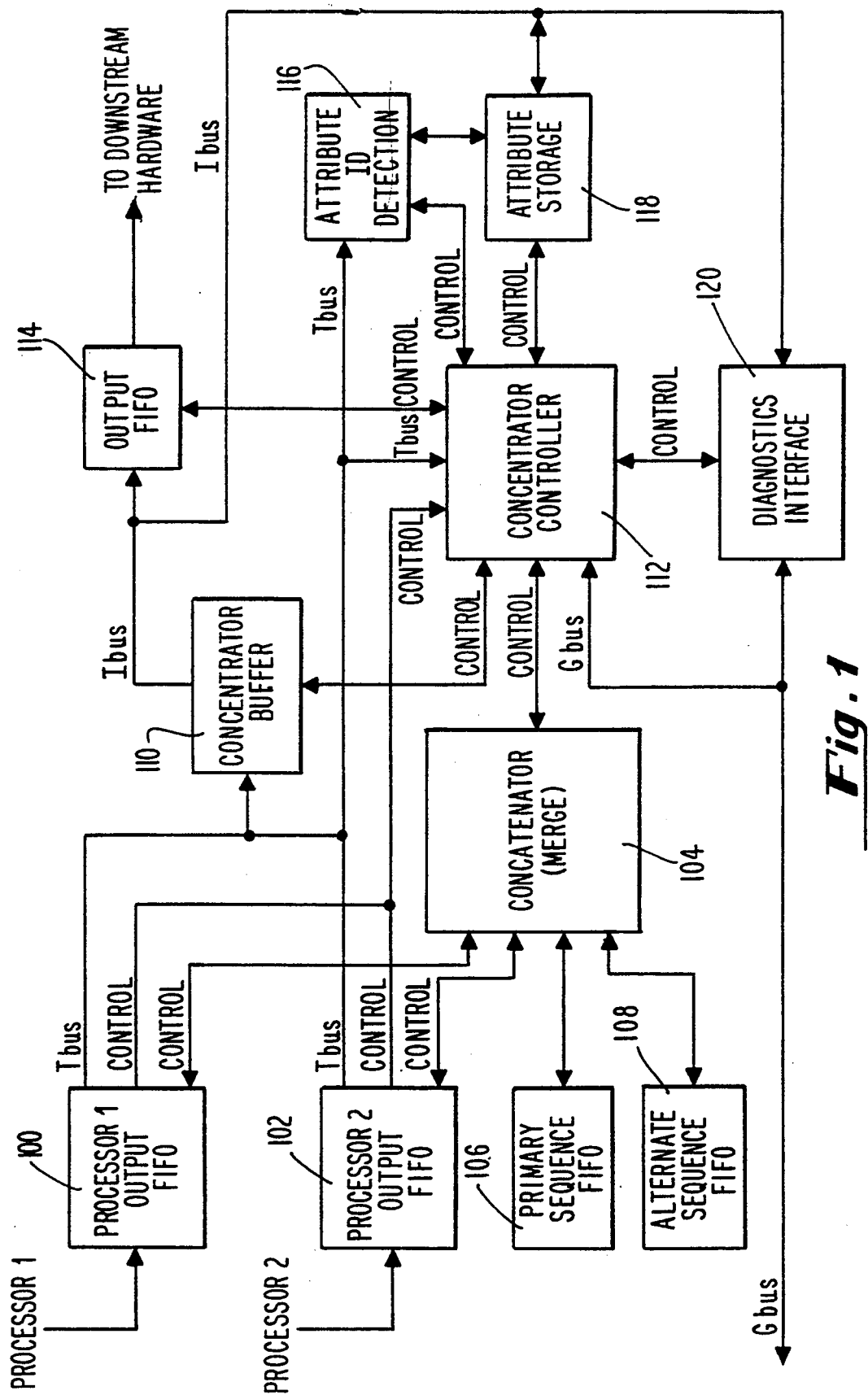
FIG. 1 schematically illustrates a concentrator in accordance with a presently preferred embodiment of the invention.

The inventor of the subject matter disclosed and claimed herein has satisfied the above-mentioned long-felt needs in the art by developing a concentrator consisting of several components which act together to enable data packets including, for example, graphics commands and graphics primitives from different inputs to be combined in a predefined order to form a pipelined data source which may be distributed to one or more specified destinations. The process is independent of the form or format of the data that is being processed and allows, on command, insertion of a set of graphics commands and primitives into a data stream. In addition, graphics attribute data which is used in the rendering of the graphics image may also be directly inserted into the data stream during pipeline diagnostics. This multi-function concentrator of the invention allows for optimum pipeline performance and greatly simplified diagnostics as will be clear from the following detailed description.

A device with the above and other beneficial features in accordance with a presently preferred embodiment of the invention will be described below with reference to FIGS. 1-3. Although the invention is herein described in conjunction with a graphics processing system, where the serial data stream comprises pipelined graphics data and primitives, it will be appreciated by those of ordinary skill in the art that the principles of the invention may be applied in various other processing environments as well. Moreover, those skilled in the art will appreciate that the description given herein is for explanatory purposes only and is not intended in any way to limit the scope of the invention. All questions regarding the scope of the invention may be resolved by referring to the appended claims.

As just noted, the present invention will be described in the context of a graphics processing system as a presently preferred embodiment. Accordingly, the data packets of the invention will typically include graphics commands and primitives which are grouped together in such a way to constitute a graphics entity. As will be explained more fully below, some data packets may be sub-divided into subpackets which describe attributes of the graphics entity. As used herein, such an attribute is a description which specifies the context in which other data packets are to be processed. In addition, context characteristics such as window size, background and foreground colors may also be considered to be attribute information for purposes of this application. Such attributes are implemented in terms of special data packets which specify the context, and a group of data packets with the same context will have the same data attributes. An attribute of a graphics entity may include, for example, the texture, the colors RGB, the transparency $\alpha$ of the image and other features of the image as would be apparent to one of ordinary skill in the art.

Reference will also be given herein to a data source from which the data packets are supplied and a data destination to which the data packets are distributed. As used herein, a data source is a data bus or some other device which may have multiple inputs for providing input data streams, while a data destination is a data bus or some other device which may have one or more outputs. Only one data source may be specified at a time, but one or more destinations can be specified at any one time.

A general description of a preferred embodiment of the invention will now be given with respect to FIG. 1.

FIG. 1 schematically illustrates a concentrator for providing data stream concentration, attribute data storage and graphics pipeline diagnostics capabilities in accordance with the invention. The concentrator of the invention is preferably used in conjunction with a hardware distributor for distributing serial instruction stream data to parallel processors as described in copending application Ser. No. 07/492,516, assigned to the assignee of this invention and hereby incorporated by reference as if fully set forth herein. As set forth in that application, a host processor including a graphics subsystem typically generates a serial stream of data comprising, for example, a plurality of command/data packets including graphics commands and primitives and outputs these command/data packets across a system I/O bus to a host interface before providing the command/data packets to an input processor. The processed command/data packets are then queued to a source FIFO before being distributed to one or more parallel processors for processing.

FIG. 1 shows the output sides of two such processors, which in the context of a graphics system typically comprise geometric transformation engines. As shown, the processed outputs of the processors are provided to output FIFOs 100 and 102, which respectively provide the processed outputs of processors 1 and 2 to the concentrator of the invention. Generally, the data processed by processors 1 and 2 are stored in output FIFOs 100 and 102 until the data may be resequenced into the same order as the original command sequence by the concentrator in accordance with the invention.

As described in the aforementioned copending application Ser. No. 07/492,516 the data output by output FIFOs 100 and 102 may be recombined into a data sequence having the same ordering as the original command sequence under control of a concatenator (merge) circuit 104 by reading from primary sequence FIFO 106 and alternate sequence FIFO 108 the respective processor IDs of the processors to which the data packets were assigned for processing. A more detailed description of the operation of the primary sequence FIFO 106 and alternate sequence FIFO 108 and the resequencing may be found in the aforementioned copending application Ser. No. 07/492,516. The resequenced data read from the output FIFOs 100 and 102 is then placed on a Tbus for transfer to a concentrator buffer 110. The Tbus thus provides the data packets and subpackets as well as information such as concentrator commands and end of data packet flags to the concentrator buffer 110, which stores at least one unit of data from the Tbus and separates the Tbus from the one or more destinations to which the data packets are to be sent via the Ibus.

Data packets from the Tbus are written into and read out of concentrator buffer 110 under control of concentrator controller 112. Concentrator controller 112 generally coordinates all activities of the concentrator. It assigns one source and one or more destinations for each data transfer, detects end of packet flags, provides for bus switching and determines when the source and all specified destinations are ready for data transfer. For example, concentrator controller 112 will assign the concentrator buffer 110 as the data source and output FIFO 114 as the data destination when it is desired to send the processed data packets down the pipeline to downstream hardware. The various functions of the concentrator controller 112 will be described in more detail below with respect to FIGS. 2 and 3.

The concentrator in accordance with the invention also includes means by which attribute data may be stored in the graphics pipeline so as to prevent unnecessary data transfer. In particular, attribute ID detection circuit 116 checks the data packets received from the Tbus and compares the attribute identification numbers in subpackets therein with the attribute identification numbers of the attributes currently stored in attribute storage register 118 and being used by the downstream hardware. As will be described in more detail below with respect to FIG. 2, if the attribute data in the received data packet is different from that stored in the attribute storage register 118, the attribute data stored in the attribute storage register 118 will be updated to reflect the new attribute data and the new attribute data will be inserted into the pipeline.

Generally, the attribute storage register 118 contains data packets for insertion, on command, into the data stream. When data is placed into attribute storage register 118, it is designated as a data destination by concentrator controller 112 as will be described below. On the other hand, when data is to be inserted into the data stream from attribute storage register 118, it is designated as a data source. Thus, data packets in attribute storage register 118 are accessible by a storage address and terminated with an end flag, independent of the stored data format. Concentrator controller 112 distinguishes between requests to insert the previous packet into the pipeline and requests for a different packet, thereby preventing duplication of effort.

Finally, the concentrator of FIG. 1 also includes a Gbus interface 120 for connecting a bidirectional Gbus having one end connected to receive output directly from the host processing system to the output Ibus for inserting data into or extracting data from the pipeline under user control. In other words, a user of the graphics processing system may access the Ibus directly by specifying the Gbus as a source or destination of the data transfer under control of the concentrator controller 112. In this manner, the user may monitor and even override the concentrator's operation for diagnostic purposes and insert graphics data downstream for storage and quick retrieval. This feature of the invention will be described in more detail below with respect to FIG. 3.

The circuit of FIG. 1 thus supports the three primary functions of the invention. Namely, the concentrator of FIG. 1 merges the data streams outputted from a plurality of parallel processors, provides means within the graphics pipeline for attribute storage and update, and specifies data sources and destinations for each transfer of processed data packets. Each of these features of the invention will now be described in more detail with respect to FIGS. 2 and 3.

DATA STREAM CONCENTRATION

As noted above, the primary purpose of the concentrator of the invention is to merge commands from parallel processing units (transform engines) in the same order as the commands were received by the transform engines. This feature of the invention has been described in detail in the aforementioned copending application Ser. No. 07/492,516 which has been incorporated by reference in its entirety. As noted therein, the merge process consists of merging the command/data packets from the processor output FIFOs 100 and 102 in accordance with processor ID values stored in primary sequence FIFO 106 and alternate sequence FIFO 108. Merge circuit 104 performs this merge function as therein described and passes the merged data stream to concentrator buffer 110 for temporary storage.

Two assumptions are inherent in the merge scheme of the invention. First, the input commands that will be processed but which will not produce a pipeline command at the output of the transform engine or send attribute data down the pipeline must be identified. Of the input commands that produce a pipeline command, those input commands which generate complex processing commands which may be broken up and processed in parallel (such as Bsplines) must also be identified. Second, the host processor software and/or the input processor which identifies the logical command blocks must keep commands together when they are assigned to the transform engines for processing. A logical block of commands can produce one or many pipeline commands, and hence, the input processor or the command/data packet distributor must set the primary sequence FIFO's end tag bit to identify the end of a logical command block. In this manner, the command/data packet distributor need write only one entry into the primary sequence FIFO 106 for each logical command block.

In a preferred embodiment of the invention, the data processed by the transform engines consists of 32 bits of data, a command tag and an end tag. The command tag designates the word containing command information, while the end tag accompanies the last word of a logical block. The merge process need only identify the end tag in order to determine when to read the next pointer from one of the sequence FIFOs. There is one exception to this rule and that is when attribute data is sent downstream. In this case, the first end tag is used to denote the attribute data set and the second end tag is used to denote the end of the logical block. As a result, attribute commands may be imbedded within logical blocks of pipelined data so that the merge process may treat a logical block as one command with zero or more trailing data words.

During operation, merge circuit 104 typically designates the next data output FIFO (100 or 102) to be read by placing the designated output FIFO in an active state. If the concentrator buffer 110 is ready to receive data, the designated output FIFO places its processed data on the Tbus. If data is not available in the chosen output FIFO, the FIFO's output ready signal will be inactive and the Tbus will remain in a hold state until the output ready becomes active. At this time a transfer of data will take place. If the output ready remains active, a second word may be placed on the Tbus within a clock cycle, and the output FIFO will continue this process until its output ready becomes inactive or the concentrator buffer 110 is no longer ready to receive data (e.g., it is full). This transferral of merged data into the concentrator buffer 110 is based on the FIFOs being ready to output and the state of the downstream pipeline buffer. For example, if the concentrator buffer 110 is empty, then it is in a position to receive data, but if it is currently full, then its ability to receive data is then based on the downstream pipeline buffer (i.e., output FIFO 114) being ready to receive data.

Merge circuit 104 operates in accordance with the merge algorithm set forth in the aforementioned co-pending application Ser. No. 07/492,516 unless interrupted by the concentrator to service a Gbus interrupt from the host processor as will be described below. The only variation to this scheme is that when an attribute pipeline command is active, the concentrator is placed into a mode which causes the attribute command end tag bit to be ignored. When the attribute pipeline command is no longer active, the merge process resumes where it left off. The merged data stored in concentrator buffer 110 is then further manipulated as will be described with respect to FIGS. 2 and 3.

ATTRIBUTE/CONTEXT DATA STORAGE AND SWITCHING

In accordance with this feature of the invention, the concentrator functions to off-load a portion of the attribute/context switching function from the transform engine and to provide some general purpose functions. The attribute/context switching is activated by specifying an attribute set number in a concentrator attribute command, which may be a subpacket in a command/data packet from the transform engine or which may be provided from the user via the Gbus. When such a command is received, the concentrator quickly inserts a set of commands into the pipeline that alters the downstream registers for processing of the graphics commands.

Attribute and context switching is the process of setting up a new set of attributes or contexts to be used in processing graphics commands. As noted above, attributes are characteristics assigned to geometric primitives such as color, line style and surface texture and are determined by the host processing system and sent to the transform engine. The transform engine associates one or more primitives with one set of attributes, which is then sent through the pipeline to set up the downstream registers before the primitive commands are sent. Downstream, the attributes may be represented by register values which are used in the rendering process. An attribute switch is required every time a geometric primitive command requires a different set of attributes than was last used in the rendering process. Contexts, on the other hand, are characteristics related to a particular process such as the window size, background and foreground colors, and the like. Contexts have their own set of registers much like attributes. Context switching occurs when the transform engine receives a command to process information in a different window, for example. However, since the concentrator of the invention treats context information the same as attribute information, only attributes will be referred to herein, and accordingly, all references to attributes will also apply to context information.

In accordance with the invention, there are three functions associated with attributes switching, namely, assigning attributes to primitive commands, changing attributes when a new set is required and managing the sets of attributes commands.

Attributes are assigned by segmenting geometric objects at the transform engine into a number of smaller primitive objects and specifying the geometric objects in terms of downstream primitive commands. Primitive commands generated from common geometric objects specify the same sets of attributes. Accordingly, it is only necessary to set up the attribute registers once for a set of commands using the same set of attributes, and the attributes need only be changed when commands specify a different set of attributes than are currently loaded into the registers.

Attribute values are changed in the downstream registers by sending a new attribute value imbedded in a command for each register in the attribute set. In accordance with the invention, in order to conserve the transform engine's processing time, an attribute number may be assigned to each set of attributes and a duplicate set of attributes may be stored in the concentrator. Then, each time the transform engine wants to specify a set of attributes, it sends a read attribute command to the concentrator to send the attribute set specified by the attribute number down the pipeline. The concentrator preferably tests each read attribute command for a change in attribute number and sends a new set of attributes downstream only if the attribute number is different than the current set. This method has the advantage of saving the transform engine the task of determining the current attribute each time a command is generated, thereby saving processing time.

The concentrator may store a limited number of attribute sets. The transform engine thus will have to keep a current table of attribute sets stored in the concentrator and check the list every time it has to switch attributes. If the required attribute set is not in the concentrator's table, the transform engine will have to send a write attribute command followed by the set of attributes it wants installed. The write attribute command allows the option of storing only the attribute data that is being sent down the pipeline. Also, as will be discussed below, attribute data provided by the user via a Gbus also may be stored in the concentrator.

The transform engine is generally responsible for managing the information in the concentrator storage in order to minimize the complexity and cost of the concentrator. The transform engine determines the start address and the amount of storage required for each set. It also understands what sets are currently stored in the concentrator and determines which attributes must be overwritten in order to store a new set when the storage has reached its capacity. The concentrator does not perform any management function other than responding to the store and send commands. This information is all passed through concentrator controller 112 as will be described below.

Figure 2:
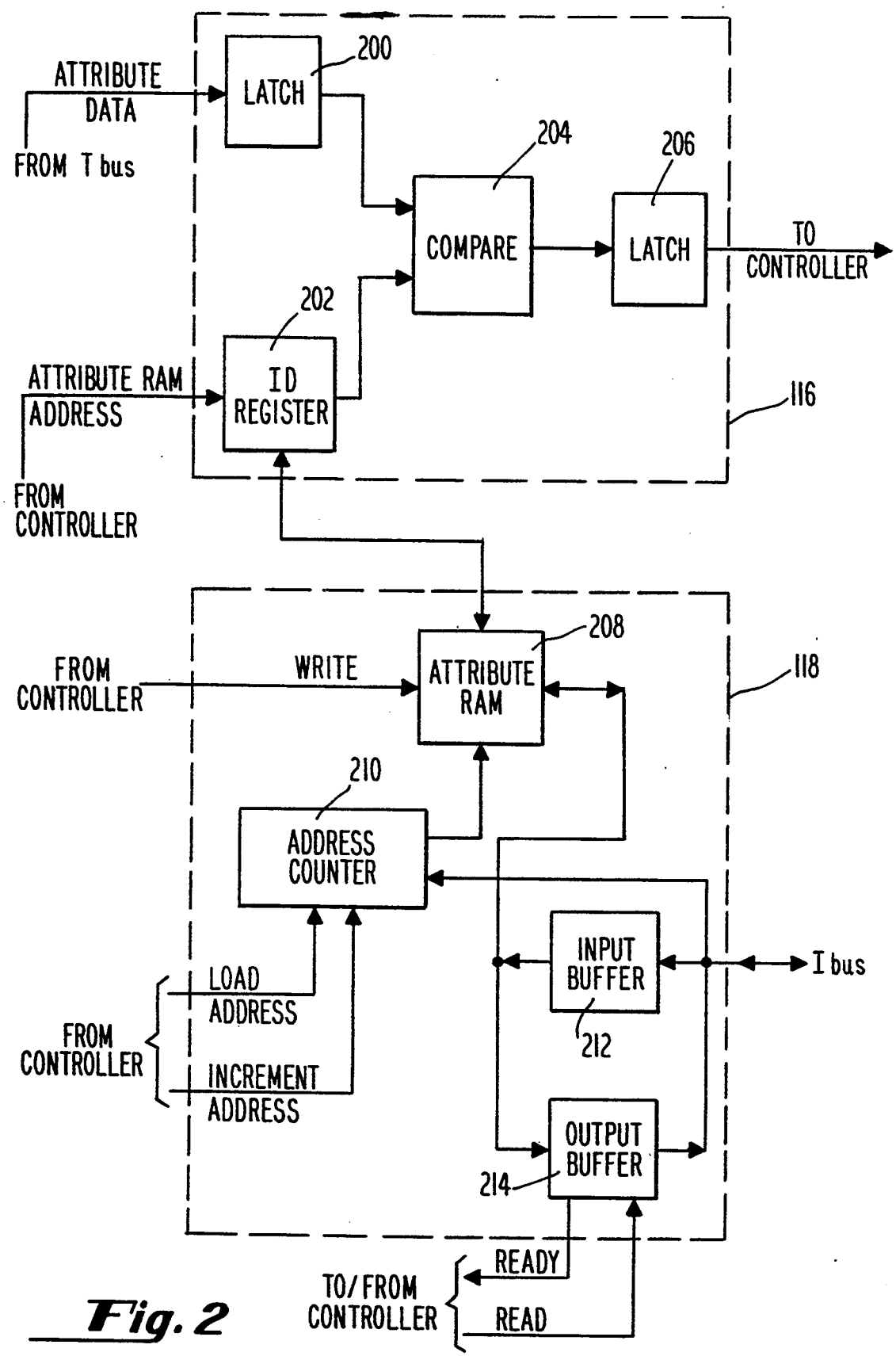
FIG. 2 schematically illustrates an embodiment of attribute storage and attribute ID detection circuits for use in the circuit of FIG. 1.

A preferred embodiment of the attribute storage and management system in accordance with the invention is shown in FIG. 2. As shown therein, attribute ID detector 116 for comparing attribute numbers preferably comprises a latch circuit 200 which receives the attribute identification number data from the Tbus. The received attribute identification number is then compared with the identification number of the last attribute sent down the pipeline and stored as described above. The identification number of the last attribute sent down the pipeline is read into attribute ID register 202 and compared with the current attribute identification number in comparator 204. The comparison result is then latched in latch circuit 206 and output to the concentrator controller 112 to indicate whether the attribute numbers are the same. The concentrator controller 112 may then instruct the transform engine to change the attributes, if necessary, or to perform necessary attribute storage management. If the attributes are to be switched, attribute commands are sent by the transform engine and grouped together into a set, starting with the concentrator command to store an attribute set, followed by one or more attribute commands and then ending with an end tag bit set on the last attribute word. The concentrator will maintain the end tag bit when storing the attribute set so that it will not have to keep track of the length of the set. Attribute commands sent by the concentrator downstream require only the command tag and do not require the logical grouping as denoted by the end tag.

The attribute values are stored in an attribute RAM 208, which is addressed by an address counter 210 as shown in FIG. 2. The attribute values are written into the attribute RAM 208 at an address specified by address counter 210 when a write signal is received from the concentrator controller 112 upon instruction by the transform engine. In addition, as will be described below, attribute values may be written into the attribute RAM 208 during diagnostic testing by inputting data from the Ibus via the input buffer 212. The attribute values from attribute RAM 208 also may be output to the Ibus via output buffer 214 for insertion into the pipeline. This process is again performed under the control of concentrator controller 112.

In a preferred embodiment of the invention, attribute RAM 208 consists of a static RAM which will hold about 80 sets of attribute and context commands of about 100 registers per set or 160 sets of 50 registers. Since the transform engine manages the storage allocation, attribute sets can be of any length and the total number of sets is a function of the total storage capacity. Address counter 210 may be loaded from the address field of store or send attribute commands (described below) and is incremented each time an attribute command is stored or retrieved from attribute RAM 208. Attributes are stored beginning at the start address as specified in the store command, and the depth of storage for each attribute set is determined by storing data from the start address until the end tag is detected. The transform engine is responsible for determining storage allocation of each attribute set.

In a preferred embodiment of the invention, concentrator controller 112 must detect five commands from the transform engine. Three commands are for storing or retrieving attribute data, while the other commands comprise a NOP command and a pipe plug command. Each command contains a field specifying either the store or send (read/write) functions, while other bits of the attribute command words preferably specify the attribute set starting address in the attribute RAM 208. This address is provided to address counter 210, which is then incremented under control of concentrator controller 112.

In accordance with a preferred embodiment of the invention, there are several protocols which govern the attribute storage function. A Tbus protocol specifies the method of obtaining the concentrator attribute command from the processor output FIFO without interfering with the merge sequencing process. Store and send attribute protocols specify the procedures for storing attribute sets from the transform engine and sending the specified set down the pipeline.

Under the Tbus protocol, the set of attribute commands from the transform engine is not identified in the primary sequence FIFO 106 since attribute switching is not a direct command from the host processor to the transform engine, but is instead contained in the information to render an image. Primary sequence FIFO 106 contains a pointer to a block of rendering commands in the processor output FIFO, which contains a logical block of attribute commands imbedded in the logical block rendering commands. The set of attribute commands terminate with the end tag bit set. The rendering command will typically follow the attribute set and will also terminate with its end tag bit set. Thus, during operation, merge circuit 104 must detect the attribute set's end tag without returning to the primary sequence FIFO 106 for another instruction. Merge circuit 104 must also detect the concentrator's commands and set a bit to override the attribute command's end tag so as not to return to the primary sequence FIFO 106 for the next instruction.

Under the store command protocol, the store command is issued by the transform engine when it wants to specify an attribute set that is not currently contained in the concentrator's attribute RAM 208. The concentrator controller 112 detects the store command, loads the address counter 210 with the start address and sets the concentrator command bit to override the end tag which would have sent the merge circuit 104 back to the primary sequence FIFO 106 for the next pointer. The store command also sets a bit in the concentrator controller 112 to write to the attribute RAM 208. The concentrator command word is dumped and the first attribute command is written to the attribute RAM 208. Address counter 210 is incremented after each data transfer. The concentrator controller 112 knows to transfer each word until after the end tag is detected, and when the end tag is detected, the merge circuit 104 resets the concentrator command bit and continues to read the output FIFO. In addition, the store command provides the option to specify that the attribute data is also to be transferred down the pipeline while writing to the attribute RAM 208 if the command bit is set.

Under the send protocol, the send command is issued by the transform engine when it determines an attribute set is required for a rendering command and the attribute set is in the attribute RAM 208. The concentrator controller 112 detects the send command and determines if the attribute identification number is the current attribute. If it is current, no further action is taken and the concentrator controller 112 reads the next pipeline data word. If, however, the specified identification number is not current, the address counter 210 is loaded with the start address and the attribute command bit is set to override the end tag which would have sent the merge circuit 104 back to the primary sequence FIFO for the next pointer. It also causes the attribute RAM 208 to be specified as the data source. The concentrator command word is then dumped and the first attribute command is read from the attribute RAM 208. The concentrator knows to transfer each word to the output FIFO 114 until after the end tag is detected, at which time, the concentrator controller 112 resets the concentrator command bit and the merge circuit 104 continues to read the processor output FIFO for a new set of commands.

The NOP command is preferably provided for the case where a transform engine decides to terminate its data stream and return the merge control to the primary sequence FIFO 106 for the next instruction. The end tag bit of the command would have to be set, but any data in the data word would be stopped at the concentrator and not passed downstream.

As will be described in more detail below, the pipe plug command is provided for diagnostic purposes when it is desired to stop the processing after a particular instruction. The only way in the preferred embodiment of clearing the plug is to send a Gbus command that restores the concentrator to its normal operating mode. The pipe plug command is stopped at the concentrator and does not pass down the pipeline.

HOST BUS INTERFACE AND SOURCE/DESTINATION DESIGNATION

A host bus (Gbus) interface is supported by the concentrator of the invention which may be used for diagnostic purposes and is not required for certain applications. However, such a feature is beneficial in that direct access to the pipeline is facilitated. Because of this diagnostic capability, the concentrator of the invention may plug the pipeline to allow the host processor to fetch or insert instructions into the pipeline at the concentrator, read and write to the attribute RAM 208, unload the sequence FIFOs and load the merge circuit 104 with a new transform engine identification number from either the current sequence FIFO or from the Gbus. In addition, to further facilitate diagnostics, the concentrator of the invention allows the user to read the transform engine output data and to write information directly into downstream pixel processors. As a result of this feature, the concentrator can support two modes of operation. One mode will direct the data from the transform engines to the host processor instead of sending it to the downstream hardware, while the second mode copies the data to the host processor as it is passed through the concentrator to the downstream hardware. In the former mode, the concentrator will plug the pipeline until the host processor removes the data word unless intermediate storage is provided.

Another diagnostic function of the invention is to read and write the attribute RAM 208. This feature is provided as a direct way for testing for the malfunctioning of the attribute RAM 208. It will also serve to test the transform engine's ability to manage the attribute RAM in a proper way.

The sequence FIFO diagnostic functions allow for an operational test of the sequence FIFO unloading capability independent of the merge process. The limitation is that the individual sequence FIFOs cannot be selected since part of the test is to observe one sequence FIFO direct the control to the other sequence FIFO.

The merge diagnostic capability of the invention works in conjunction with the Gbus plug command to allow the pipeline to be plugged from the Gbus and independently select the outputs from output FIFOs 100 and 102 for the next source of pipeline data. This feature is used with the Gbus read/write capability to inspect or alter the pipeline data. As a result, the Gbus interface must be a bidirectional interface that supports read/write operations to the pipeline and to the attribute RAM 208.

In a preferred embodiment, the Gbus shown in FIG. 1 is a 32-bit wide synchronous/asynchronous multiplex address/data bus. The Gbus interface 120 to the concentrator controller 112 preferably coprises a combined command and status register and several data registers (not shown). One data register may be used as a general input/output register for data to and from the pipeline or the attribute storage register 118. The other data registers may be used for writing data words with the command and/or end tag bits set. All such interface data registers are preferably 32 bits wide.

In a preferred embodiment of the invention, there are at least six Gbus functions supported by the concentrator controller 112 which may be provided by the user. Two functions are for accessing the pipeline; two for accessing the attribute storage register 118; one for restoring the concentrator controller 112 to normal operation; and one for resetting the concentrator controller 112 to its initial state via the host processor. The first four functions are mode functions that will continue the process until the concentrator receives the next instruction to stop what it is presently doing and start doing something else. Some of the functions may also have modifier bits imbedded into the function's instruction to modify the action of the function.

A first instruction, the read pipeline instruction, has two modes, one which will divert the data stream from the concentrator buffer 110 to the Gbus and the other which copies the data stream to the Gbus as data is written into the output FIFO 114. The command and end tag bits are reflected in the Gbus status register for each word that is read from the concentrator buffer 110. The status register may also indicate which read mode is currently active. In the divert mode, the reading of new data is based on the Gbus removing the previous word from the concentrator buffer 110, while in the copy mode, the reading of new data is based on both the Gbus and the concentrator buffer 110 readiness. The pipeline will continue to be read until the next Gbus command is received.

A second instruction, the write pipeline instruction, has one mode, but it requires the prior use of the Gbus plug command. The Gbus plug is placed in the pipeline just above the Gbus interface 120 so that the Ibus pipeline data will not intermix with the Gbus pipeline data. Writing a command tag is accomplished by writing to the data command register in the Gbus interface which sets the command tag for the data word. Non-command data is written to the data register. The end tag bit is not required, and the write operation will continue until the next Gbus command is received. The Gbus plug is removed with a restore function.

Reading from the attribute storage register 118 via the Gbus requires a start address imbedded in the read attribute function. The pipeline should be plugged so not to intermix two separate operations in the concentrator at one time. The Gbus status register may contain the command and end tag flags, either set or cleared, for each word read from attribute storage register 118. The read operation will continue until the next Gbus command is received, and the Gbus plug will be removed with the restore command.

Writing to the attribute storage register 118 requires a start address imbedded in the write attribute function. The pipeline is plugged during a write operation so that the storage will not be accessed by a pipeline command. As noted above, management of information in the storage is the responsibility of the transform engine, and accordingly, any alternations to the attribute storage register 118 should be done in coordination with the transform engines' shared memory. The write operation mode will continue until the next G bus command is received, and the Gbus plug will be removed with the restore function.

The restore function is provided to terminate any of the Gbus commands and return the concentrator controller 112 to normal operation. The restore function halts the current Gbus operation at the completion of its cycle, unplugs the pipeline and allows the concentrator controller 112 to continue its main function. The Gbus status register preferably indicates the status of the plug at any point in time.

Finally, the reset instruction may be provided to unconditionally return the concentrator controller 112 to its power up state. This is used primarily in situations where a requirement is to set the concentrator to a known initialized state without turning off the entire device.

In a preferred embodiment, there are three sources of pipeline data, namely, concentrator buffer 110, attribute storage register 118 and the Gbus, but only one source can be designated at a time. If no source is designated, then a pipeline plug condition exists. Similarly, there are three destinations for the pipelined data in the preferred embodiment, namely, output FIFO 114, attribute storage register 118 and the Gbus. Any number of destinations may be specified including none. When no destination is specified, no pipeline data will be transferred. One such case is when the attribute address counter 210 is loaded from the Gbus.

The Gbus commands from the host processor are composed of one or more bit patterns which perform different functions depending upon the value stored in the respective bits. All such commands pass through the Gbus interface 120 to the concentrator controller 112 where they are decoded. For example, different bits may specify what type of command is being sent, the source and one or more destinations of the data, whether the Gbus plug command is present, and the current state of the source and destination specifiers. The latter is used to determine when a pipeline plug is in effect or to confirm to the diagnostic programmer the intended state. Similarly, the currently selected transform engine may also be specified in particular bits of the command word, and the state of the control lines of the merge circuit 104 may be monitored. The particular technique by which the above may be accomplished is left to the discretion of one of ordinary skill in the art.

Figure 3:
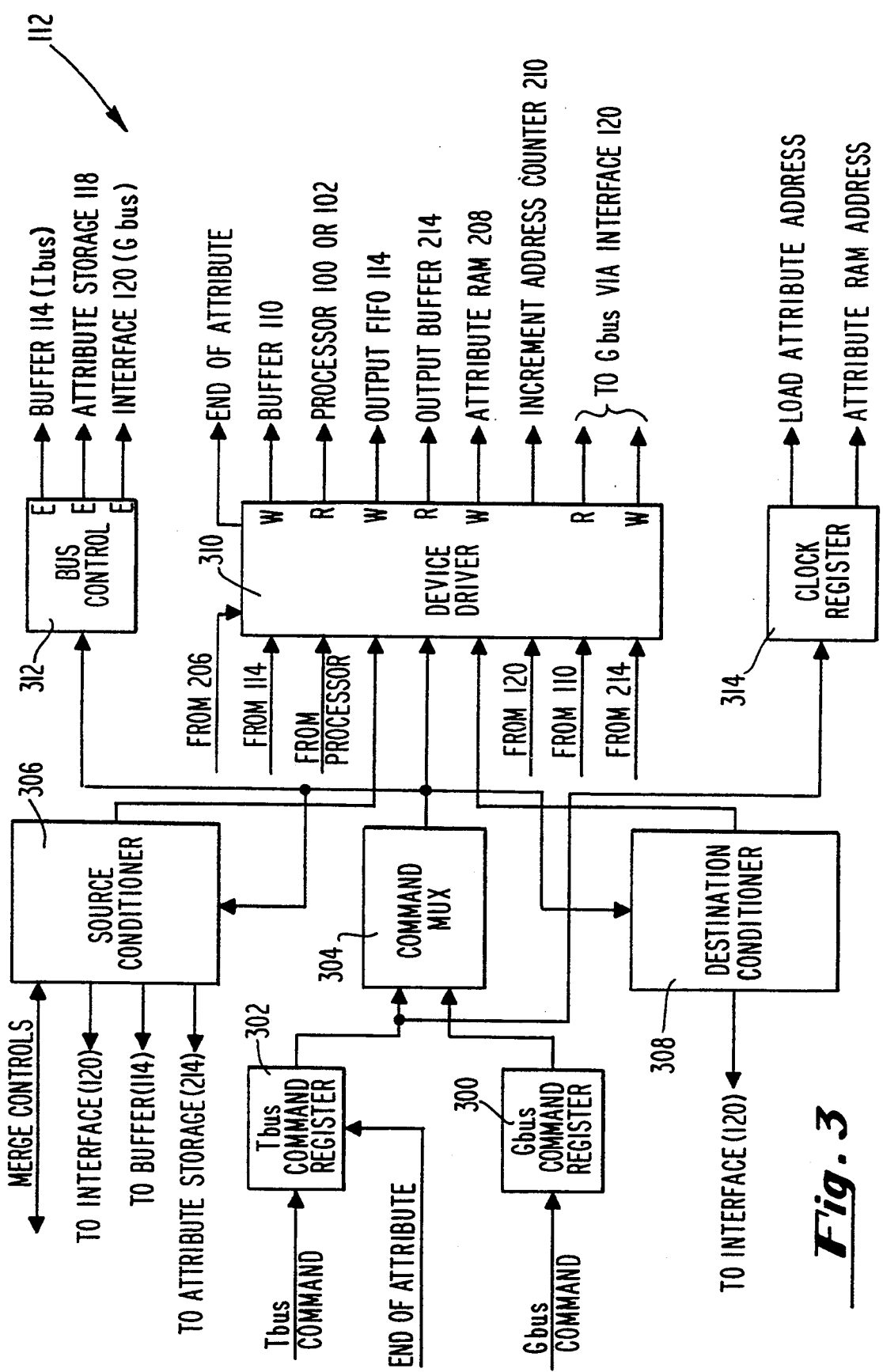
FIG. 3 schematically illustrates an embodiment of a concentrator controller for controlling each of the elements depicted in FIG. 1.

The host processor initiates most action on the Gbus by writing to the Gbus command register 300 shown in FIG. 3 and terminates that action by sending another command. The very last command should be the restore function to return the concentrator to its normal mode of operation. The at least six Gbus functions noted above can be partitioned into four protocols by the host processor. They are read, write, restore and reset. A function is a combination of one or more of these commands. One or more commands can be written to Gbus command register 302 at one time. The commands are thus partitioned into four groups: source, destination, reset and other.

A Gbus read command specifies either the concentrator buffer 110 or attribute storage register 118 as the source and the Gbus as one of the destinations. Hence, the Gbus read command initiates a read operation by sending a source command and specifying the Gbus as one of the destination commands.

Reading data from the pipeline is dependent upon data availability in the pipeline and the concentrator at the time of the read request. Thus, to read from the pipeline without disrupting the pipeline operation, a pipeline plug command should be sent. The pipeline plug command adds the Gbus as a destination without changing the source or other destination or making the Gbus ready to read. Once the Gbus is a destination, then the state of the concentrator can be observed in a static state as to what is the source and destination. However, by not making the Gbus ready to read initially, when an attribute operation is in process, the Gbus may read the data until the process changes back to the normal pipeline state. The Gbus can thus take control of the concentrator with the assurance that the Gbus controls can now return the concentrator to its normal state.

Reading data from attribute storage register 118 is also dependent on plugging the pipeline and other activities transpiring at the time. The first procedure is to send a pipeline plug command that adds the Gbus as a destination without changing the current source or other destinations. If pipeline access to the attribute storage register 118 is in progress, the access must be completed before the Gbus can affectively take over without disrupting the current process. The Gbus may read data until the process changes back to normal pipeline operation. The next step is to load the start address into the attribute address counter 210. This leaves the concentrator in a state where the Gbus is the source with no destination. Thus, a command must next be sent which specifies the attribute storage register 118 as the source and the Gbus as the destination. The attribute storage register 118 is then ready to be read unless the pipeline is specified as a destination and is not ready.

A Gbus read can be terminated at any time by sending a new Gbus command to the concentrator.

Before a Gbus write command is sent, the pipeline must be plugged. Once the plug is in place, the state of the pipeline can be determined by reading a status word of the Gbus interface 120. If a plug happens to be placed during a Gbus attribute access, the plug may be used to read data until the attribute process is complete. At this time, a Gbus command may be sent to set the concentrator into a Gbus write mode.

The host initiates a Gbus write operation by sending a command that specifies the Gbus as the source with one or more destinations. The concentrator sets up the source bus and tests the destinations for readiness. When everything is ready, the concentrator allows the transfer to take place. After the host processor writes to the data register, the concentrator transfers the data to the designated location. The destinations are again tested for readiness, and this process continues until a new command is sent to the concentrator.

Writing data to the attribute storage register 118 via the Gbus is dependent on plugging the pipeline and of other activities transpiring at the time. If a pipeline access to the attribute storage register 118 is in progress, the access must be completed, otherwise the Gbus cannot restore the concentrator to its original state. The Gbus should thus insert a Gbus plug and allow the transfer of data to continue until the attribute operation is completed and the concentrator is returned to a source pipeline state.

A Gbus write can be terminated at any time by sending a new Gbus command to the concentrator.

A restore function consists of sending the Gbus commands to set the source and destinations to the original state prior to the Gbus changing the state of the pipeline.

Finally, the reset command is primarily used to remove the concentrator from the power-up reset state. When the concentrator is powered on, the concentrator is held in a reset state until released by the host processor. This allows for a controlled reset of each section of the pipeline.

The concentrator controller 112 of the invention will now be described in detail with respect to FIG. 3.

As shown in FIG. 3, the concentrator controller 112 of the invention comprises a Gbus command register 300 which captures the concentrator commands from the Gbus and a Tbus command register 302 which captures the concentrator commands from the Tbus. When a command is present on the Tbus, this command is captured by the Tbus command register until the end of that command operation is detected, at which time a normal pipeline mode is reestablished. The same is true for the Gbus command register 300. The outputs from Tbus command register 302 and Gbus command register 300 are inputted into a command multiplexer 304, which selects either the new Gbus or Tbus command information. In a preferred embodiment, the Gbus commands take precedence over the Tbus commands in order to allow for override control. If no new commands are received, the command multiplexer 304 continues with the previous states.

Concentrator controller 112 of the invention also includes a source conditioner 306 which is responsive to the output of the command multiplexer 304 to identify the active source and its condition qualifiers for all devices controlled by the concentrator controller 112. As noted above, such a source device may be the concentrator buffer 110, the attribute storage register 118 or the Gbus. In particular, the source conditioner 306 checks to see if a read of the designated device may be accomplished by determining whether the output of the selected device is enabled. However, the actual decision to transfer data is based on the ability of all destinations to receive data. Accordingly, the actual data transfer will not take place until every element involved in the transfer is ready. Preferably, each source may include a FIFO to minimize wait times for access.

Concentrator controller 112 also includes a destination conditioner 308 which identifies the active designation devices and in some cases their condition qualifiers for each device. As previously noted, the destination designations may be output FIFO 114, the attribute storage register 118 or the Gbus. In this case, the designated destination devices are checked to see if their inputs are ready. Different commands may have different destinations and, of course, data must be available for the transfer before data transfer may occur. The checking of the data sources and destinations preferably occurs concurrently so that processing efficiency is maximized.

The concentrator controller 112 further includes a device driver 310 which outputs driver signals to activate the data transfer. Device driver 310 receives indications from the command multiplexer 304 that a command has been received, signals from source conditioner 306 and destination conditioner 308 that the designated source and destination are ready, and indications of the ready states of each devices which are controlled. When the designated source and destination is ready, the device driver 310 drives the appropriate output write or read signal to the appropriate source or destination device, respectively. Signals are also output to increment address counter 210 when an attribute value is read to or written from the attribute RAM 208, and an end of attribute signal is output to the Tbus command register when attribute processing is completed.

Concentrator controller 112 further includes a bus control device 312 which provides signals for enabling either the concentrator buffer 110, the attribute storage register 118 or the diagnostics interface 120, each of which can drive the Ibus. The enable signal for the Tbus, on the other hand, is controlled by merge circuit 104.

Finally, concentrator controller 112 includes a clock register 314 which is clocked every clock cycle on the half cycle mark and functions to provide the load attribute address and the attribute RAM address for the address counter 210 of attribute storage register 118. In particular, the load address signal is provided to load the address counter 210 at the beginning of a write to or read from the attribute RAM 208. The ID register 202 of the attribute ID detection device 116 is also loaded with the address of the attribute RAM 208 data by clock register 314 when a new set of attribute data is written to the output FIFO 114.

The concentrator herein described thus functions to merge data streams from multiple inputs based on supplied information in commands in contrast to time based concentrators. A merge algorithm assembles packets and sub-packets of information in a designated order so that sequential and hierarchical data packets can be merged from different inputs. The concentrator's attributes storage feature also enables data packets and attribute data to be inserted into the data stream using a single command. The command preferably has modifiers to force a data packet insertion or to insert the data packet only if the previous insertion was different than the currently specified insertion. As a result, repetitious data does not have to be inserted and the originating input does not have to communicate with other inputs to determine the current attributes. Moreover, the concentrator of the invention enables data streams to be routed by a single command specifying one source and one or more destinations. This method greatly simplifies the architecture of the system for switching from one source and/or destination bus to another and also allows the source and destination ready conditions to be evaluated at the same time rather than serially so as to minimize transfer time. The concentrator of the invention thus reduces the complexity of the system while increasing the transfer rate. Finally, the diagnostic interface of the invention, by isolating sources, provides for independent input switching for each source without affecting other components of the concentrator.

Although an exemplary embodiment of the invention has been described in detail above, those skilled in the art will readily appreciate that many additional modifications are possible in the exemplary embodiment without materially departing from the novel teachings and advantages of the invention. For example, the techniques in accordance with the invention may be applied to substantially different types of commands and other processing environments besides a graphics system as herein described. In addition, the processing functions of the concentrator controller 112 and the merge circuit 104 may be combined under common processor control so that all functions of the concentrator are controlled by a single processor. Accordingly, all such modifications are intended to be included within the scope of this invention as defined in the following claims.

What is claimed is:

1. A device for providing direct user access to a pipelined data stream, comprising:
    at least one data source for providing packets of data processing commands and associated data;
    combining means for combining said packets of data processing commands and associated data in a predetermined order to form said pipelined data stream;
    a user interface for outputting said pipelined data stream from said combining means to at least one data destination under direct user control, said at least one data destination includes a processing unit of a user, said user interface comprising control means for selectively extracting and inserting said packets of data processing commands and associated data directly from and into said pipelined data stream on command of the user; and
    an attribute ID storage register for storing an attribute identification number indicative of attribute data in a command, said attribute data specifying a context in which subsequent data packets are to be processed, said attribute ID storage register stores a new attribute identification number when the new attribute identification number is not the same as a stored attribute identification number stored in the attribute ID storage register, said stored attribute identification number indicative of an attribute which is currently installed downstream in the pipelined data stream.

2. A device as in claim 1, wherein said attribute ID storage register is designated as a data source and said user interface provides attribute data corresponding to a designated attribute identification number stored in said attribute ID storage register to said at least one data destination under direct user control.

3. A device as in claim 2, wherein said at least one data destination includes an output buffer, said output buffer sends said pipelined data stream downstream.

4. A device as in claim 1, wherein said attribute ID storage register is designated as a data destination and said user interface provides said new attribute identification number to said attribute ID storage register from said processing unit of the user.

5. A device as in claim 1, further comprising attribute identification means for comparing said new attribute identification number with said attribute identification number corresponding to an attribute currently installed downstream in said pipelined data stream.

6. A device as in claim 1, wherein said attribute ID storage register comprises:
    a random access memory for storing said attribute identification number indicative of an attribute which is currently installed downstream in the pipelined data stream; and
    addressing means for providing a write address to said random access memory when said random access memory is to be updated to include said new attribute identification number, said addressing means further providing a read address when said attribute identification number, indicative of an attribute which is currently installed downstream in the pipelined data stream, is to be read from the pipelined data stream.

7. A device as in claim 1, wherein said user interface concurrently checks whether all data sources and all data destinations may respectively output and receive data, said user interface allowing transfer of data packets from a designated data source to said at least one data destination only when the designated data source is ready to output data and all designated data destinations are ready to receive data.

8. A device as in claim 1, wherein said combining means sequentially reads said at least one data source in an order designated by source identification values stored in recording means.

9. A device as in claim 8, wherein said recording means comprises a primary sequence first-in-first-out buffer (FIFO) from which said source identification values are sequentially read.

10. A device as in claim 9, wherein said recording means further comprises an alternate sequence first-in-first-out buffer (FIFO) for providing sequential reading of the source identification values for commands, said commands originating from more than one source.

11. A device as in claim 10, wherein an alternate flag is read from said primary sequence FIFO for commands, said commands originating from more than one source, said alternate flag indicating that said source identification values are to be read from said alternate sequence FIFO for each source from which said command is received.

12. A device as in claim 11, wherein a switch flag is read from said alternate sequence FIFO when all source identification values for said command from more than one source have been read, said switch flag indicating that said source identification values are now to be read from said primary sequence FIFO.

13. A device as in claim 12, wherein said combining means sequentially reads said source identification values from said primary sequence FIFO and reads processed data from an output of the source corresponding to a read source identification value until an alternate flag is read from said primary sequence FIFO, at which time said combining means sequentially reads said source identification values from said alternate sequence FIFO and reads processed data from an output of the source corresponding to the read source identification value until a switch flag is read.

14. A device for providing direct user access to a pipelined graphics data stream, comprising:
    at least one data source for providing packets of graphics commands and graphics primitives;
    combining means for combining said packets of graphic commands and graphic primitives in a predetermined order to form said pipelined graphics data stream;
    a user interface for outputting said pipelined graphics data stream from said combining means to at least one data destination under direct user control, said at least one data destination includes a processing unit of a user, said user interface comprising control means for selectively extracting and inserting said packets of graphics commands and graphics primitives directly from and into said pipelined graphics data stream on command of the user; and
    attribute ID storage means for storing an attribute identification number indicative of attribute data in a graphics command, said attribute data specifying a context in which subsequent packets are to be processed, said attribute ID storage means stores a new attribute identification number when the new attribute identification number is not the same as a stored attribute identification number stored in the attribute ID storage means, said stored attribute identification number indicative of an attribute which is currently installed downstream in the pipelined graphics data stream.

15. A device as in claim 14, wherein said attribute ID storage means is designated as a data source and said user interface provides attribute data corresponding to a designated attribute identification number stored in said attribute ID storage means to said at least one data destination under direct user control.

16. A device as in claim 15, wherein said at least one data destination includes an output buffer, said output buffer sends said pipelined graphics data stream downstream.

17. A device as in claim 14, wherein said attribute ID storage means is designated as a data destination and said user interface provides said new attribute identification number to said attribute ID storage means from said processing unit of the user.

18. A device as in claim 14, further comprising attribute identification means for comparing said new attribute identification number with said attribute identification number corresponding to an attribute currently installed downstream in said pipelined graphics data stream.

19. A device as in claim 14, wherein said attribute ID storage means comprises:
    a random access memory for storing said attribute identification umber indicative of an attribute which is currently installed downstream in the pipelined graphics data stream; and
    addressing means for providing a write address to said random access memory when said random access memory is to be updated to include said new attribute identification number, said addressing means further providing a read address when said attribute identification number, indicative of an attribute which is currently installed downstream in the pipelined graphics data stream is to be read from the pipelined graphics data stream.

20. A device as in claim 14, wherein said user interface concurrently checks whether all data sources and all data destinations may respectively output and receive data, said user interface allowing transfer of packets from a designated data source to said at least one data destination only when the designated data source is ready to output data and all designated data destinations are ready to receive data.

21. A device as in claim 14, wherein said combining means sequentially reads said at least one data source in an order designated by source identification values stored in recording means.

22. A device as in claim 21, wherein said recording means comprises a primary sequence first-in-first-out buffer (FIFO) from which said source identification values are sequentially read.

23. A device as in claim 22, wherein said recording means further comprises an alternate sequence first-in-first-out buffer (FIFO) for providing sequential reading of the source identification values for graphics commands, said graphics commands originating from more than one source.

24. A device as in claim 23, wherein an alternate flag is read from said primary sequence FIFO for graphics commands, said graphics commands originating from more than one source, said alternate flag indicating that said source identification values are to be read from said alternate sequence FIFO for each source from which said graphics command is received.

25. A device as in claim 24, wherein a switch flag is read from said alternate sequence FIFO when all source identification values for said graphics command from more than one source have been read, said switch flag indicating that said source identification values are now to be read from said primary sequence FIFO.

26. A device as in claim 25, wherein said combining means sequentially reads said source identification values from said primary sequence FIFO and reads processed data from an output of the source corresponding to a read source identification value until an alternate flag is read from said primary sequence FIFO, at which time said combining means sequentially reads said source identification values from said alternate sequence FIFO and reads processed data from an output of the source corresponding to the read source identification value until a switch flag is read.

27. A device as in claim 14, wherein said attribute data includes graphics contexts for a particular graphics process.

28. A device as in claim 27, wherein said graphics contexts include at least one context of window size, background color and foreground color.

29. A device as in claim 14, wherein said user interface plugs said pipelined graphics data stream so that contents of said pipelined graphics data stream may be viewed after processing of a particular graphics command.

30. A device as in claim 14, wherein said user interface further comprises a host bus interface through which the user may supply graphics commands, graphics primitives and attribute data directly to said pipelined graphics data stream and receive processed graphics commands, graphics primitives and attribute data directly from said pipelined graphics data stream, said pipelined graphics data stream under control of said control means.

31. An attribute data storage system for a graphics pipelined of a graphics processing system, comprising:
at least one data source for providing packets of graphics commands and graphics primitives, said graphics commands including attribute identification values corresponding to attribute data specifying a context in which subsequent packets are to be processed;
means for storing a new attribute identification value provided by said at least one data source when it is not the same as an attribute identification value previously stored for an attribute which is currently installed downstream in the pipelined data stream; and
means for passing downstream attribute data corresponding to said new attribute identification value provided by at least one data source when said new attribute identification value is not the same as an attribute identification value previously stored for an attribute which is currently installed downstream in the pipelined data stream.

32. A system as in claim 31, further comprising means for selectively extracting and inserting said packets from and into said graphics pipeline under direct user control.

33. A method of providing direct user access to a pipelined data stream, comprising:
providing packets of data processing commands and associated data from at least one data source;
combining said packets of data processing commands and associated data in a predetermined order to form said pipelined data stream;
providing said pipelined data stream to at least one data destination under direct user control, said at least one data destination includes a processing unit of a user, said pipelined data stream providing step comprising the step of selectively extracting and inserting said packets of data processing commands and associated data directly from and into said pipelined data stream on command of the user; and
storing an attribute identification number indicative of attribute data in a command in an attribute ID storage register, said attribute data specifying a context in which subsequent data packets are to be processed, said attribute ID storage register stores a new attribute identification number when the new attribute ID number is not the same as a stored attribute identification number stored in the attribute ID storage register, said stored attribute ID number indicative of an attribute which is currently installed downstream in the pipelined data stream.

34. A method as in claim 33, comprising the further steps of designating said attribute ID storage register as a data source and providing attribute data corresponding to a designated attribute identification number stored in said attribute ID storage register to said at least one data destination under direct user control.

35. A method as in claim 33, comprising the further steps of designating said attribute ID storage register as a data destination and providing said new attribute identification number to said attribute ID storage register from said processing unit of the user.

36. A method as in claim 33, comprising the further step of comparing said new attribute identification number with said attribute identification number corresponding to an attribute currently installed downstream in said pipelined data stream.

37. A method as in claim 33, comprising the further steps of providing a write address to said attribute ID storage register when it is to be updated to include said new attribute identification number and providing a read address when said attribute identification number corresponding to an attribute which is currently installed downstream in the pipelined data stream is to be read therefrom.

38. A method as in claim 33, comprising the further steps of concurrently checking whether all data sources and all data destinations may respectively output and receive data and allowing transfer of data packets from a designated data source to said at least one data destination only when the designated data source is ready to output data and all designated data destinations are ready to receive data.

39. A method as in claim 33, wherein said combining step includes the step of sequentially reading said at least one data source in an order designated by source identification values stored in a primary sequence first-in-first-out buffer (FIFO).

40. A method as in claim 39, wherein said sequentially reading step further includes the step of sequentially reading source identification values for commands from more than one source, said source identification values are read from an alternate sequence first-in-first-out buffer (FIFO).

41. A method as in claim 40, further comprising the step of reading an alternate flag from said primary sequence FIFO for commands from more than one source, said alternate flag indicating that said source identification values are to be read from said alternate sequence FIFO for each source from which said command is received.

42. A method as in claim 41, further comprising the step of reading a switch flag from said alternate sequence FIFO when all source identification values for said command from more than one source have been read, said switch flag indicating that said source identification values are now to be read from said primary sequence FIFO.

43. A method as in claim 42, further comprising the steps of sequentially reading said source identification values from said primary sequence FIFO and reading processed data from an output of the source corresponding to the read source identification value until an alternate flag is read from said primary sequence FIFO, and then sequentially reading said source identification values from said alternate sequence FIFO and reading processed data from an output of the source corresponding to the read source identification value until a switch flag is read.

* * * * *